(12) United States Patent
Adachi et al.

(10) Patent No.: US 8,962,122 B2
(45) Date of Patent: Feb. 24, 2015

(54) SEALING MATERIAL

(75) Inventors: Kouichi Adachi, Hasuda (JP); Shunji Hyoudou, Shimamoto (JP); Yasuhiro Konishi, Nagoya (JP)

(73) Assignee: Sekisui Chemical Co., Ltd., Osaka (JP)

( * ) Notice: Subject to any disclaimer, the term of this patent is extended or adjusted under 35 U.S.C. 154(b) by 724 days.

(21) Appl. No.: 12/733,307

(22) PCT Filed: Aug. 22, 2008

(86) PCT No.: PCT/JP2008/065017
§ 371 (c)(1),
(2), (4) Date: Feb. 23, 2010

(87) PCT Pub. No.: WO2009/028419
PCT Pub. Date: Mar. 5, 2009

(65) Prior Publication Data
US 2010/0178459 A1    Jul. 15, 2010

(30) Foreign Application Priority Data

Aug. 24, 2007  (JP) ................. 2007-217896

(51) Int. Cl.
*B32B 3/26* (2006.01)
*E04B 1/68* (2006.01)
(Continued)

(52) U.S. Cl.
CPC ............ *E04B 1/6812* (2013.01); *B32B 5/18* (2013.01); *B32B 7/02* (2013.01); *B32B 25/08* (2013.01);
(Continued)

(58) Field of Classification Search
CPC ............ B32B 5/18; B32B 7/02; B32B 25/08; C09K 3/10; C09K 2200/0607; C09K 2200/062; C09K 2200/0612; F16J 15/104; F16J 15/102; E04B 1/66; E04B 1/6812
USPC ............. 428/131, 138, 159, 304.4, 314.4
See application file for complete search history.

(56) References Cited

U.S. PATENT DOCUMENTS

| 5,759,659 A * | 6/1998 | Sanocki et al. ............. 428/74 |
| 2003/0146582 A1* | 8/2003 | Seki et al. .................. 277/650 |
| 2009/0169860 A1* | 7/2009 | Katsunori et al. ......... 428/314.8 |

FOREIGN PATENT DOCUMENTS

| EP | 1-362 903 | 11/2003 |
| JP | 57-203543 | 12/1982 |

(Continued)

OTHER PUBLICATIONS

Broughton, W. R., Mera, R. D., Hinopoulos, G., Project PAJ3—Combined Cyclic Loading and Hostile Environments 1996-1999: Report No. 13—Creeping Testing of Adhesive Joints T-Peel Test, Oct. 1999, NPL Report CMMT(A) 193, pp. 4-5.*

(Continued)

*Primary Examiner* — Maria Veronica Ewald
*Assistant Examiner* — Brian Handville
(74) *Attorney, Agent, or Firm* — Wenderoth, Lind & Ponack, L.L.P.

(57) ABSTRACT

The present invention provides a sealing material having excellent water resistance for a long time. A sealing material A of the present invention comprises: a rubber resin sheet 1; and a thermoplastic resin foam layer 2 formed at least on one surface of the rubber resin sheet 1. The sealing material A has a 25% compressive strength in a thickness direction of 2 to 40 kPa as measured in accordance with JIS K6767 and the thermoplastic resin foam layer 2 has a closed cell ratio of 10 to 60%. As a result, the sealing material A has excellent water resistance right after the use thereof and even after a long time has elapsed, and is suitably used in various applications.

5 Claims, 3 Drawing Sheets

(51) Int. Cl.
  *B32B 5/18* (2006.01)
  *B32B 7/02* (2006.01)
  *B32B 25/08* (2006.01)
  *C09K 3/10* (2006.01)
  *E04B 1/66* (2006.01)
  *F16J 15/10* (2006.01)

(52) U.S. Cl.
  CPC ... *C09K 3/10* (2013.01); *E04B 1/66* (2013.01); *F16J 15/102* (2013.01); *F16J 15/104* (2013.01); *C09K 2200/0607* (2013.01); *C09K 2200/0612* (2013.01); *C09K 2200/062* (2013.01)
  USPC .......... 428/138; 428/159; 428/314.4

(56) References Cited

FOREIGN PATENT DOCUMENTS

| | | |
|---|---|---|
| JP | 61-95519 | 6/1986 |
| JP | 9-111899 | 4/1997 |
| JP | 10-114005 A * | 4/1998 |
| WO | 02/066573 | 8/2002 |
| WO | 2007/072885 | 6/2007 |

OTHER PUBLICATIONS

International Search Report issued Oct. 14, 2008 in International (PCT) Application No. PCT/JP2008/065017.

* cited by examiner

SEALING MATERIAL

This application is a U.S. national stage of International Application No. PCT/JP2008/065017 filed Aug. 22, 2008.

TECHNICAL FIELD

The present invention is related to a sealing material which has excellent water resistance for a long time.

BACKGROUND ART

Foam materials are currently used as sealing materials in various fields such as architecture, civil engineering, electrics, electronics, and vehicles. Examples of the foam materials used as sealing materials include thermoplastic resin foams comprising resins such as polyethylene resin and polypropylene resin, and rubber foams comprising rubbers such as synthetic rubbers and natural rubbers.

Of the sealing materials, water-resistant sealing materials are used for filling gaps of various structures such as buildings, electric devices, and vehicles to prevent water infiltration into the structures. The water-resistant sealing material is placed at a place to be sealed in its compressed state, and resilient stress generated by shape recovery from its compressed state allows the sealing material to closely adhere to the interface of the sealed place without a gap.

In the case where the water-resistant sealing material has low flexibility against compression, the water-resistant sealing material generates too high resilient stress, resulting in deformation of the sealed place. The deformation of the sealed place causes expansion of the gap of the structure. This results in decrease in adherence (hereinafter, referred to as sealability) of the water-resistant sealing material to the sealed place, thereby causing insufficient water resistance.

Accordingly, open-cell foam materials are used as the water-resistant sealing materials as the open-cell foam materials have excellent flexibility against compression. On the other hand, the open-cell foam material contains cells communicating with one another. This causes easy infiltration of water into the foam material, resulting in poor water resistance. In the case where the open-cell foam material absorbs water to swell and thereby achieves good sealability, the open-cell foam material has poor sealability until it sufficiently absorbs water, and thus, the open-cell foam material allows water to infiltrate therein before achieving sufficient sealability.

A foam material containing both closed cells and open cells is also used as the water-resistant sealing material. In such a foam material, the closed cells contribute to good water resistance, and the open cells contribute to good flexibility against compression. For example, Patent Document 1 discloses a foam material which contains both closed cells and open cells. In that foam material, eight or more cells per 1 cm in length are contained.

Disadvantageously, the resilient stress generated by the regular sealing material is reduced when the water-resistant sealing material is used for a long time. This causes reduction in sealability, resulting in insufficient water resistance.

Patent Document 1: Japanese Kokai Publication H09-111899 (JP-A H09-111899)

DISCLOSURE OF THE INVENTION

Problems to be Solved by the Invention

The present invention provides a sealing material having excellent water resistance for a long time.

A sealing material A of the present invention comprises a rubber resin sheet 1 and a thermoplastic resin foam layer 2 formed at least on one surface of the rubber resin sheet 1. The sealing material A has a 25% compressive strength in a thickness direction of 2 to 40 kPa as measured in accordance with JIS K6767 and the thermoplastic resin foam layer 2 has a closed cell ratio of 10 to 60%.

The rubber resin contained in the rubber resin sheet 1 of the sealing material of the present invention is not specifically limited as long as it has rubber elasticity at room temperature. Examples thereof include chloroprene rubber (CR), isoprene rubber (IR), butyl rubber (IIR), nitrile-butadiene rubber (NBR), natural rubber, styrene-butadiene rubber (SBR), butadiene rubber (BR), urethane rubber, fluorine rubber, acryl rubber, ethylene-propylene rubber, ethylene-propylene-diene rubber, urethane rubber, and silicone rubber. In particular, nitrile-butadiene rubber (NBR), styrene-butadiene rubber (SBR), butyl rubber (IIR), and chloroprene rubber (CR) are preferably used as the rubber resins because they provide rubber resin sheets with excellent durability and good cushioning. The rubber resins having rubber elasticity at room temperature may be used alone, or two or more of these may be used in combination. It is to be noted that nitrile-butadiene rubber (NBR) in the present description includes a rubber called nitrile rubber. Further, it is to be noted that stylene-butadiene rubber (SBR) in the present description includes a rubber called styrol rubber.

The rubber resin sheet 1 may have a single-layer structure or a multi-layer structure. In addition, the rubber resin sheet 1 may be a foam sheet or a non-foam sheet. A rubber resin foam sheet is preferred as the rubber resin sheet 1 because of its repulsive force against compression. Further, the rubber resin foam sheet is preferably a closed cell foam sheet. A sealing material including a closed cell foam sheet that comprises a rubber resin is excellent in sealability.

In the case where the rubber resin sheet 1 is a closed cell foam sheet comprising a rubber resin, the closed cell foam sheet comprising a rubber resin preferably has the closed cell ratio of 80 to 100%, and more preferably 85 to 100%. When the closed cell foam sheet comprising a rubber resin has a small closed cell ratio, the water resistance of the sealing material may be deteriorated.

The closed cell ratio of the closed cell foam sheet comprising a rubber resin is determined as follows. First, a square-shaped test sample having a size of 5 cm×5 cm and a constant thickness is cut out from the closed cell foam sheet comprising a rubber resin. Then, the weight $W_1$ and the thickness of the test sample are measured to determine the apparent volume $V_1$ of the test sample.

Next, the value obtained above is substituted in the following formula to determine the apparent volume $V_2$ of the foams. Here, the density of the resin constituting the test sample is represented as $\rho g/cm^3$.

$$\text{Apparent volume } V_2 \text{ of the foams} = V_1 - W_1/\rho$$

The test sample is immersed in distilled water at 23° C. to a depth of 100 mm from the water surface. Then, the test sample is pressurized at 15 kPa for three minutes. The test sample is taken out from the water, and water on the surface of the test sample is removed. The weight $W_2$ of the test sample is measured, and the open cell ratio $F_1$ and the closed cell ratio $F_2$ are determined according to the following formulae.

Open cell ratio $F_1(\%)=100\times(W_2-W_1)/V_2$

Closed cell ratio $F_2(\%)=100-F_1$

The closed cell foam sheet comprising a rubber resin preferably has a density of 30 to 100 kg/m³. In the case where the closed cell foam sheet comprising a rubber resin has a too-low density, the rubber resin sheet tends to be weak. It results in a failure in maintaining the water resistance for a long time under severe environmental conditions. On the other hand, in the case where the closed cell foam sheet comprising a rubber resin has a too-high density, the closed cell foam sheet comprising a rubber resin tends to be hard, resulting in a deformation of the place to be sealed under high pressure. As a result, the sealability of the sealing material may be deteriorated.

Further, the thermoplastic resin foam layer 2 is formed at least on one surface of the rubber resin sheet 1. The thermoplastic resin foam layer 2 is preferably integrally laminated to one surface of the rubber resin sheet 1. The thermoplastic resin constituting the thermoplastic resin foam layer is not specifically limited. Examples thereof include: polyethylene resins such as linear low-density polyethylene, high pressure low-density polyethylene, medium-density polyethylene, high-density polyethylene, ethylene-propylene copolymers, ethylene-α-olefin copolymers, ethylene-vinyl acetate copolymers, ethylene-(meth)acrylic acid copolymers, and ethylene-(meth)acrylate copolymers; polypropylene resins such as polypropylene and propylene-α-olefin copolymers; thermoplastic elastomers such as a polyolefin elastomer, a polystyrene elastomer, a polyamide elastomer, and a polyester elastomer; and polyvinyl chloride. The thermoplastic elastomers, the polyethylene resins, and polypropylene resins are preferred because of their excellent moldability. It is to be noted that the thermoplastic resins may be used alone, or two or more of these may be used in combination.

Here, α-olefins are not specifically limited, and examples thereof include butene, 4-methyl-1-pentene, pentene, hexene, heptene, and octene. Further, α-olefins may be used alone, or two or more of them may be used in combination.

The thermoplastic resin foam layer has a closed cell ratio of 10 to 60%. When the closed cell ratio is too low, the water resistance of the sealing material is deteriorated. On the other hand, when the closed cell ratio is too high, the compression permanent set of the sealing material is increased. As a result, the sealing material fails to maintain the excellent water resistance for a long time. In addition, when the closed cell ratio is too high, the sealing material has high compressive strength and generates a large repulsive force. As a result, the sealing material is not readily applied to the gap. The closed cell ratio in the thermoplastic resin foam layer is determined in the same manner as that for the closed cell foam sheet comprising a rubber resin.

On a surface of the thermoplastic resin foam layer, hole portions 21 may be formed as shown in FIG. 2. The hole portions 21 formed on the thermoplastic resin form layer can control the closed cell ratio and the compression permanent set. When a thermoplastic resin foam sheet 2 is used as the thermoplastic resin foam layer, the thermoplastic resin foam layer may have the hole portions 21 also on the surface in contact with the rubber resin sheet as shown in FIG. 3.

The configuration where the hole portions 21 are formed on one surface or both surfaces of the thermoplastic resin foam layer is not specifically limited. The opening edge of the hole portion 21 may be in a shape of: a polygonal shape such as triangle and quadriclateral; a perfect circle; or an elliptical shape. The opening edge of the hole portion 21 is preferably in a shape of a polygonal shape or a perfect circle.

The hole portions 21 may be formed on the surface of the thermoplastic resin foam layer such that its depth direction is perpendicular to that surface as shown in FIGS. 2 and 3. Further, the hole portions 21 may be formed on the surface of the thermoplastic resin foam layer such that its depth direction is oblique to that surface as shown in FIG. 4. In addition, the hole portions 21 may penetrate through the thermoplastic resin foam layer in the thickness direction thereof as shown in FIG. 5.

The depth of the hole portion 21 is preferably not less than 25%, more preferably 40 to 100% of the thickness of the thermoplastic resin foam layer. When the depth of the hole portion 21 is too shallow, the compression permanent set tends to be increased. It results in a failure in maintaining the excellent water resistance for a long time under severe environmental conditions. Further, when the depth of the hole portion 21 is too shallow, the sealing material tends to have high compressive strength and generate a large repulsive force. As a result, the sealing material is not readily applied to the gap. It is to be noted that the depth of the hole portion 21 being 100% of the thickness of the thermoplastic resin foam layer refers to the hole portion 21 penetrating through the thermoplastic resin foam layer in the thickness direction thereof.

The depth of the hole portion 21 refers to a distance from the surface of the thermoplastic resin foam layer to the deepest part of the hole portion 21 in the holing direction of the hole portion 21. More specifically, it refers to a distance between the center of the perfect circle with the minimum diameter capable of surrounding the opening edge of the hole portion 21 and the deepest part of the hole portion 21.

One hole portion 21 is preferably disposed so that the center of the opening edge of the hole portion 21 is spaced from that of an adjacent hole portion 21 at a distance of 0.5 to 5 mm. When the distance between the centers is too short, the open cell ratio in the thermoplastic resin foam layer is increased, resulting in deterioration of the initial water resistance of the sealing material under severe environmental conditions. On the other hand, when the distance between the centers is too long, the compression permanent set of the sealing material tends to be increased, resulting in a failure in maintaining the excellent water resistance of the sealing material for a long time under severe environmental conditions. In addition, when the distance between the centers is too long, the sealing material tends to have high compressive strength and generate a large repulsive force. As a result, the sealing material is not readily applied to the gap. It is to be noted that the center of the opening edge of the hole portion 21 refers to a center of a perfect circle with the minimum diameter capable of surrounding the opening edge of the hole portion 21.

The adjacent hole portions 21 are determined as follows. As shown in FIG. 6, any two hole portions 21 are selected and lines $L_1$ and $L_2$ are drawn so as to tangent to two perfect circles 21a with the minimum diameter capable of surrounding the selected hole portions 21 respectively and so as not to cross each other. When a third hole portion 21 or a part of the third hole portion 21 is not present in the portion surrounded by the two hole portions 21 and two lines $L_1$ and $L_2$, the selected two hole portions 21 are regarded to be adjacent to each other. Accordingly, two hole portions 21, 21 in FIG. 6(a) are adjacent to each other. However, two hole portions 21', 21' in FIG. 6(b) are not adjacent to each other and any one of the hole portions 21' and a hole portion 21" are respectively adjacent to each other.

An adhesive layer may be formed on the thermoplastic resin foam layer 2. An adhesive constituting the adhesive layer is not specifically limited, and examples thereof include an acrylic adhesive. Further, a commercially available double-side adhesive tape may be applied to the thermoplastic resin foam layer 2 to form the adhesive layer on the thermoplastic resin foam layer 2.

Next, a procedure for producing the sealing material is described. First, a known method may be employed as a method for producing a rubber resin sheet. For example, a raw material composition comprising a rubber resin, added with a filler and the like, if necessary, is kneaded by using a kneader such as a BANBURY MIXER and a pressure kneader, when needed. Then, the obtained material is continuously kneaded by using a calendar apparatus, extruder, conveyor belt casting apparatus, or the like to be formed into a sheet. It is to be noted that the raw material composition contains 50% by weight or more of the rubber resin.

In the case where the rubber resin sheet is a rubber resin foam sheet, a known method may be employed as a method for producing the rubber resin foam sheet. For example, a foamable raw material composition comprising a rubber resin, a crosslinking agent, and a pyrolytic foaming agent, added with a filler and the like, if necessary, is kneaded by using a kneader such as a BANBURY MIXER and a pressure kneader, when needed. Then, the obtained material is continuously kneaded by using a calendar apparatus, extruder, conveyor belt casting apparatus, or the like to be formed into a foamable sheet. This foamable sheet is caused to foam while or after heated and cross-linked so that a closed cell foam sheet comprising a rubber resin is produced. For another example, a foamable raw material composition comprising a rubber resin and a pyrolytic foaming agent, added with a filler and the like, if necessary, is kneaded by using a kneader such as a BANBURY MIXER and a pressure kneader, when needed. Then, the obtained material is continuously kneaded by using a calendar apparatus, extruder, conveyor belt casting apparatus, or the like to be formed into a foamable sheet. After the foamable sheet is cross-linked by ionizing radiation, the foamable sheet was heated to foam so that a closed cell foam sheet comprising a rubber resin is produced. It is to be noted that the foamable raw material composition contains 50% by weight or more of the rubber resin.

Examples of the cross-linking agent include organic peroxides, sulfur, and sulfur compounds. Among these, organic peroxides are preferred. Examples of the ionizing radiation include optical radiation, γ radiation, and electron radiation. Examples of the organic peroxides include diisopropylbenzene hydroperoxide, 2,4-dichlorobenzoyl peroxide, benzoyl peroxide, t-butyl perbenzoate, cumyl hydroperoxide, t-butyl hydroperoxide, 1,1-di(t-butylperoxy)-3,3,5-trimethylhexane, n-butyl-4,4-di(t-butylperoxy)valerate, $\alpha,\alpha'$-bis(t-butylperoxy isopropyl)benzene, 2,5-dimethyl-2,5-di(t-butylperoxy)hexyne-3, and t-butylperoxy cumene. Examples of the sulfur compounds include tetramethylthiuram disulfide, tetramethylthiuram monosulfide, zinc dimethyldithiocarbamate, 2-mercapto benzothiazole, dibenzothiazyl disulfide, N-cyclohexyl-2-benzothiazole sulfenamide, N-t-butyl-2-benzothiazole sulfenamide, sulfur monochloride, and sulfur dichloride.

The amount of the cross-linking agent contained in the foamable raw material composition is preferably 0.05 to 10 parts by weight and more preferably 0.1 to 7 parts by weight with respect to 100 parts by weight of the rubber resin. When the amount of the cross-linking agent is too small, the gel fraction (degree of cross-linking) of the foamable raw material composition is not suitable for foaming, which leads to foam breaking. As a result, a rubber resin foam sheet may not be obtained. When the amount of the cross-linking agent is too large, the gel fraction (degree of cross-linking) of the foamable raw material composition is too much increased, which may cause the foamable raw material composition not to foam.

The pyrolytic foaming agent refers to an agent decomposed by heat to generate foaming gas. The pyrolytic foaming agent is not specifically limited, and examples thereof include azodicarbonamide, benzenesulfonyl hydrazide, dinitroso pentamethylene tetramine, toluene sulfonyl hydrazide, and 4,4-oxybis(benzenesulfonylhydrazide). The pyrolytic foaming agents may be used alone, or two or more of these may be used in combination. The amount of the pyrolytic foaming agent blended in the foamable raw material composition is preferably 1 to 30 parts by weight with respect to 100 parts by weight of the rubber resin.

The amount of the pyrolytic foaming agent contained in the foamable raw material composition is preferably 3 to 20 parts by weight and more preferably 5 to 15 parts by weight with respect to 100 parts by weight of the rubber resin. When the amount of the pyrolytic foaming agent is too small, the expansion ratio of the rubber resin foam sheet is not increased so that the apparent density thereof is increased. As a result, the rubber resin foam sheet may generate a strong repulsive force. When the amount of the pyrolytic foaming agent is too large, the apparent density of the rubber resin foam sheet is reduced. As a result, the compression permanent set of the rubber resin foam sheet may be increased.

The irradiation dose of ionizing radiation may be appropriately adjusted in accordance with the characteristics of the rubber resin. The dose is preferably 0.5 to 10 Mrad, and more preferably 0.7 to 5.0 Mrad.

A method for producing the thermoplastic resin foam sheet is not specifically limited. For example, a composition comprising a thermoplastic resin and the pyrolytic foaming agent, if necessary, added with a cross-linking aid is charged into an extruder. The composition is melt-kneaded and then extruded to produce a foamable resin sheet. The foamable resin sheet is cross-linked by the ionizing radiation. After that, the foamable resin sheet is heated to the temperature higher than the decomposition temperature of the pyrolytic foaming agent so as to foam. For another example, a thermoplastic resin and a physical foaming agent are charged into an extruder and melt-kneaded therein. Extrusion of the obtained material into a sheet shape is carried out by using the extruder. The cross-linking aid is not specifically limited and examples thereof include trimethylolpropane trimethacrylate.

The physical foaming agent refers to an agent for foaming the thermoplastic resin as follows: the agent mixed with the thermoplastic resin under pressure evaporates when the pressure is released and that evaporation causes the thermoplastic resin to foam. Examples of the physical foaming agent include: aliphatic hydrocarbons such as propane, butane, pentane, hexane, and heptane; halogenated hydrocarbons such as trichlorofluoromethane, dichlorodifluoromethane, dichlorotetrafluoroethane, and trichlorotrifluoroethane; nitrogen; carbon dioxide; and air.

Examples of a method for adjusting the closed cell ratio in the thermoplastic resin foam layer 2 to 10 to 60% include the following methods:

(1) the thermoplastic resin foam sheet is compressed in the thickness direction so that a part of closed cells are collapsed and exploded to be made into open cells;

(2) shear stress is applied to the thermoplastic resin foam sheet so that a part of closed cells are exploded to be made into open cells;

(3) the amount of the physical foaming agent for extrusion-foaming is adjusted so that a part of cells in the thermoplastic resin foam sheet is broken;

(4) the thermoplastic resin foam sheet is pierced with a needle to have hole portions formed thereon;

(5) the thermoplastic resin foam sheet is pierced with a needle concurrently with being compressed in the thickness direction;

(6) the thermoplastic resin foam sheet was pierced with a needle concurrently with being heated to partially melt so that hole portions are formed thereon;

(7) the thermoplastic resin foam sheet is irradiated with laser beam to partially melt so that hole portions are formed thereon; and (8) the thermoplastic resin foam layer formed on the surface of the rubber resin sheet is irradiated with laser beam to melt so that hole portions are formed thereon.

These methods may be employed in combination. In the case where the thermoplastic resin foam sheet is pierced with a needle, adjustment of the shape of the needle, the piercing depth and the formation density of hole portions allows adjustment of the closed cell ratio in the thermoplastic resin foam sheet 2.

The thermoplastic resin foam sheet is required to be flexible before a part of cells therein is broken, in order to have a 25% compressive strength in the thickness direction of 2 to 40 kPa as measured in accordance with JIS K6767. The thermoplastic resin foam sheet preferably has a 25% compressive strength of not more than 200 kPa, and more preferably 20 to 100 kPa as measured in accordance with JIS K6767, before a part of cells therein is broken.

The thermoplastic resin foam sheet 21 may have the hole portions 21 formed on one or both surfaces. The hole portions 21 are preferably formed on one or both surfaces of the thermoplastic resin foam sheet 2 before the thermoplastic resin foam sheet 2 and a rubber resin sheet are integrally laminated.

A method for forming the hole portions 21 on one or both surfaces of the thermoplastic resin foam sheet 2 is not specifically limited. For example, a pair of rolls are prepared and a large number of needles are provided on the surface of one or both rolls. The thermoplastic resin foam sheet 2 is passed between the rolls so that needles on the roll surface pierce the thermoplastic resin foam sheet 2.

A method for forming the hole portions 21 in the thermoplastic resin foam layer 2 formed on the rubber resin sheet 1 is not specifically limited. For example, a pair of rolls are prepared and a large number of needles are provided on the surface of one or both rolls. The sealing material is passed between the rolls so that needles on the roll surface pierce the thermoplastic resin foam layer 2.

A method for integrally laminating the rubber resin sheet 1 and the thermoplastic resin foam layer 2 is not specifically limited. For example, the rubber resin sheet 1 and the thermoplastic resin foam sheet 2 may be heat-sealed. For another example, the rubber resin sheet 1 and the thermoplastic resin foam sheet 2 may be integrally laminated by using a bond, adhesive, or double-side adhesive tape.

There has been described a method in which the thermoplastic resin foam sheet is integrally laminated on one surface of the rubber resin sheet 1. As another method, a foamable thermoplastic resin may be applied to one surface of a rubber resin sheet to form a foamable thermoplastic resin layer. And then, the foamable thermoplastic resin layer may be caused to foam to produce a thermoplastic resin foam layer. It is to be noted that the foamable thermoplastic resin can be obtained by mixing a thermoplastic resin and a pyrolytic foaming agent.

The 25% compressive strength of the sealing material in the thickness direction is limited to 2 to 40 kPa, and more preferably 4 to 35 kPa as measured in accordance with JIS K6767. When the 25% compressive strength is too small, the sealing material generates only a small repulsive force, resulting in lowered initial water resistance. When the 25% compressive strength is too large, the sealing material tends to have a large compression permanent set, resulting in a failure in maintaining the excellent water resistance for a long time. Further, when the 25% compressive strength is too large, the sealing material tends to have high compressive strength and generate a large repulsive force. As a result, the sealing material is difficult to be applied to the gap of the structure.

In the sealing material A, the rubber resin sheet preferably has a peel strength of not less than 20 kPa right after an application to an acrylic plate and a peel strength of not less than 50 kPa after keeping at 70° C. for 12 hours of the rubber resin sheet applied to the acrylic plate, as measured in accordance with JIS K6850. The peel strength in the above range allows the sealing material A to maintain the excellent water resistance for a long time.

The peel strength of the rubber resin sheet in the sealing material A as measured in accordance with JIS K6850 may be adjusted by using an adhesive material such as butyl rubber (IIR), nitrile rubber (nitrile-butadiene rubber) (NBR), and styrene-butadiene rubber (SBR). Alternatively, it may also be adjusted by blending a petroleum resin, fluid resin, or fluid rubber to the rubber resin.

The rubber resin sheet constituting the sealing material may have a multi-layer structure. The thermoplastic resin foam layer 2 may be formed on the surface of any rubber resin sheet, or between the adjacent two rubber resin sheets.

The surface form of the place to be sealed that is in contact with the sealing material of the present invention is not specifically limited. It may be a smooth surface or a surface with irregularities formed thereon. In the case where irregularities are formed on the surface of the place to be sealed, the sealing material may be placed so that the thermoplastic resin foam layer of the sealing material faces the place to be sealed with irregularities formed thereon. The thermoplastic resin foam layer is deformed in accordance with the irregularities on the place to be sealed so as to be in close contact with the place to be sealed. As a result, the sealing material has excellent sealability.

EFFECTS OF THE INVENTION

The sealing material of the present invention has excellent water resistance right after the use thereof and has excellent water resistance even after a long time has elapsed.

EXPLANATION OF SYMBOLS

Figure 1:
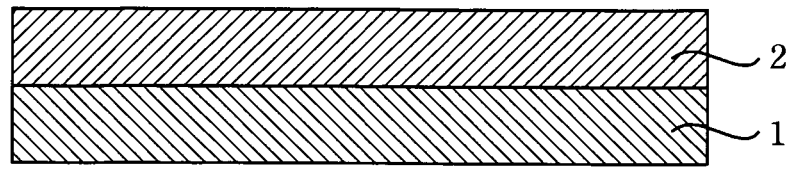
FIG. 1 is a longitudinal sectional view of the sealing material of the present invention.
Figure 2:
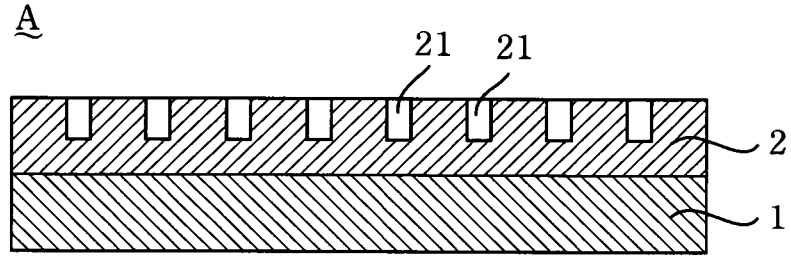
FIG. 2 is a longitudinal sectional view of the sealing material of the present invention.
Figure 3:
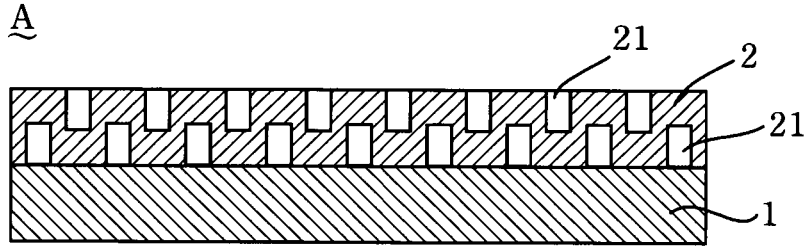
FIG. 3 is a longitudinal sectional view of the sealing material of the present invention.
Figure 4:
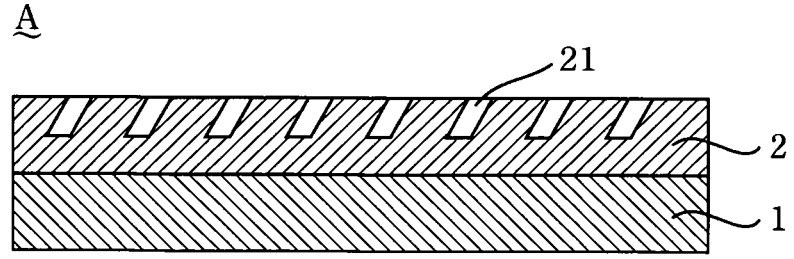
FIG. 4 is a longitudinal sectional view of the sealing material of the present invention.
Figure 5:
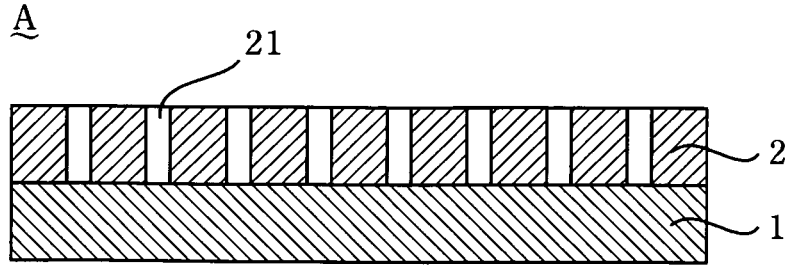
FIG. 5 is a longitudinal sectional view of the sealing material of the present invention.
Figure 6:
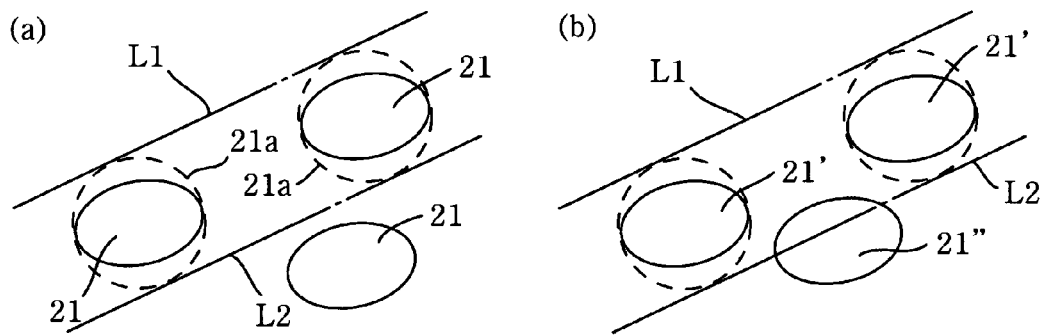
FIG. 6 is a schematic view showing the criteria to determine the adjacent hole portions.

1 Rubber resin sheet
2 Thermoplastic resin foam layer
21 Hole portion
A Sealing material

BEST MODES FOR CARRYING OUT THE INVENTION

Example 1

A pair of rolls were prepared. Each roll had quadrilateral weight-shaped needles (side length of the bottom: 0.3 mm, height: 3 mm) implanted on its whole surface on a grid at 2-mm pitches in axial and circumferential directions of the roll. The pair of rolls were facing to each other at a distance of 7 mm. Needles on the surface of one roll were adjusted not to overlap those on the surface of the other roll.

A polyethylene foam sheet having a density of 33 kg/m$^3$ and a thickness of 7.5 mm (manufactured by Sekisui Chemical Co., Ltd., product name: Softron) was passed between the pair of rolls and the needles on the surfaces pierced the both surfaces of the polyethylene foam sheet to foam a large number of hole portions 21. The polyethylene foam sheet before pierced by needles had a 25% compressive strength in a thickness direction of 55 kPa as measured in accordance with JIS K6767.

The resulting polyethylene foam sheet had a closed cell ratio of 30%. Each of the hole portions 21 formed on the both surfaces of the resulting polyethylene foam sheet 2 had a depth of 3 mm and one hole portion 21 was disposed so that the center of the opening edge of the hole portion 21 was spaced from that of an adjacent hole portion 21 at a distance of 2 to 2.82 mm.

On the other hand, acrylonitrile-butadiene rubber (NBR, density of 960 kg/m$^3$) was charged into an extruder and melt-kneaded. Then, the rubber was formed into a rubber resin sheet having a thickness of 0.5 mm by the extruder and the molten rubber resin sheet was soon integrally laminated to the polyethylene foam sheet. As a result, a sealing material was obtained.

Example 2

A pair of rolls were prepared. One roll had pyramid-shaped needles (side length of the bottom: 0.3 mm, height: 4 mm) implanted on its whole surface on a grid at 1.5-mm pitches in axial and circumferential directions of the roll. The pair of rolls were facing to each other at a distance of 4.5 mm.

A polyethylene foam sheet having a density of 28 kg/m$^3$ and a thickness of 5 mm (manufactured by Sekisui Chemical Co., Ltd., product name: Softron) was passed between the pair of rolls and the needles on the roll surface pierced the both surfaces of the polyethylene foam sheet to foam a large number of hole portions 21 thereon. The polyethylene foam sheet before pierced by needles had a 25% compressive strength in a thickness direction of 45 kPa as measured in accordance with JIS K6767.

The resulting polyethylene foam sheet had a closed cell ratio of 45%. Each of the hole portions 21 formed on the both surfaces of the resulting polyethylene foam sheet 2 had a depth of 4 mm and one hole portion 21 was disposed so that the center of the opening edge of the hole portion 21 was spaced from that of an adjacent hole portion 21 at a distance of 1.5 to 2.12 mm.

On the other hand, 100 parts by weight of acrylonitrile-butadiene rubber (NBR, density of 960 kg/m$^3$), 15 parts by weight of azodicarbonamide (manufactured by Otsuka Chemical Co., Ltd., product name: SO-L), and 0.1 parts by weight of phenolic antioxidant (manufactured by Ciba Specialty Chemicals, product name: IRGANOX 1010) were charged into an extruder and melt-kneaded. Then, the mixture was formed into a rubber resin sheet having a thickness of 1.3 mm by the extruder.

Irradiation of electron beam of 2 Mrad at an accelerating voltage of 500 keV cross-linked the obtained rubber resin sheet. Then, the rubber resin sheet was placed in a foam oven and heated to 240° C. to foam. As a result, a closed cell foam sheet comprising a rubber resin was produced. The closed cell foam sheet comprising a rubber resin had a closed cell ratio of 98%, an apparent density of 50 kg/m$^3$, and a thickness of 3 mm.

Next, the polyethylene foam sheet and the closed cell foam sheet comprising a rubber resin were heated to 200° C. by a far infrared heater and the closed cell foam sheet comprising a rubber resin was integrally laminated on one surface of the polyethylene foam sheet. As a result, a sealing material was obtained.

Example 3

A pair of rolls were prepared. Each roll had pyramid-shaped needles (side length of the bottom: 0.3 mm, height: 2 mm) implanted on its whole surface on a grid at 1.5-mm pitches in axial and circumferential directions of the roll. The pair of rolls were facing to each other at a distance of 4.5 mm. Needles on the surface of one roll were adjusted not to overlap those on the surface of the other roll.

A polyethylene foam sheet having a density of 25 kg/m$^3$ and a thickness of 5 mm (manufactured by Sekisui Chemical Co., Ltd., product name: Softron) was passed between the pair of rolls and the needles on the surfaces pierced the both surfaces of the polyethylene foam sheet to foam a large number of hole portions 21. The polyethylene foam sheet before pierced by needles had a 25% compressive strength in a thickness direction of 35 kPa as measured in accordance with JIS K6767.

The resulting polyethylene foam sheet had a closed cell ratio of 40%. Each of the hole portions 21 formed on the both surfaces of the resulting polyethylene foam sheet 2 had a depth of 2 mm and one hole portion 21 was disposed so that the center of the opening edge of the hole portion 21 was spaced from that of an adjacent hole portion 21 at a distance of 1.5 to 2.12 mm.

Here, a closed cell foam sheet comprising a rubber resin was obtained in the same manner as in Example 2. The closed cell foam sheet comprising a rubber resin was integrally laminated on one surface of the polyethylene foam sheet by interposing an acrylic adhesive.

Example 4

A sealing material was obtained in the same manner as in Example 1 except that butyl rubber (IIR, density of 920 kg/m$^3$) was used instead of acrylonitrile-butadiene rubber.

Comparative Example 1

A sealing material was obtained in the same manner as in Example 1 except that a polyethylene foam sheet having a density of 33 kg/m³, a thickness of 7.5 mm, and a closed cell ratio of 5% was used and no hole portions were formed on the polyethylene foam sheet.

Comparative Example 2

A sealing material was obtained in the same manner as in Example 1 except that a polyethylene foam sheet having a density of 33 kg/m³, a thickness of 7.5 mm, and a closed cell ratio of 85% was used and no hole portions were formed on the polyethylene foam sheet.

Comparative Example 3

A urethane foam sheet (density of 20 kg/m³, thickness of 8 mm, closed cell ratio of 2%) was used as a sealing material.

Comparative Example 4

A sealing material was obtained in the same manner as in Example 1 except that: a polyethylene foam sheet having a density of 33 kg/m³, a thickness of 7.5 mm, and a closed cell ratio of 85% was used; no hole portions were formed on the polyethylene foam sheet; and butyl rubber (IIR, density of 920 kg/m³) was used instead of acrylonitrile-butadiene rubber.

The 25% compressive strength, assemblability, short-term water resistance and long-term water resistance of each of the obtained sealing materials, and peel strength of the rubber resin sheet in the sealing material were respectively measured in the following manner. The results are shown in Table 1. In Table 1, "diameter of opening edge of hole portion" refers to a diameter of a perfect circle with the minimum diameter capable of surrounding the opening edge of the hole portion.
(25% compressive strength)

The 25% compressive strength of each of the obtained sealing material in the thickness direction was measured in accordance with JIS K6767.
(Assemblability)

A double-side adhesive tape was applied to the whole surface of the thermoplastic resin foam sheet of the sealing material. Then, a test sample S was punched out of the sealing material in a ring shape having an external diameter of 60 mm and an internal diameter of 40 mm. With regard to the sealing material of Comparative Example 3, a double-side adhesive tape was applied to any one of the surfaces of the urethane foam sheet.

Figure 7:
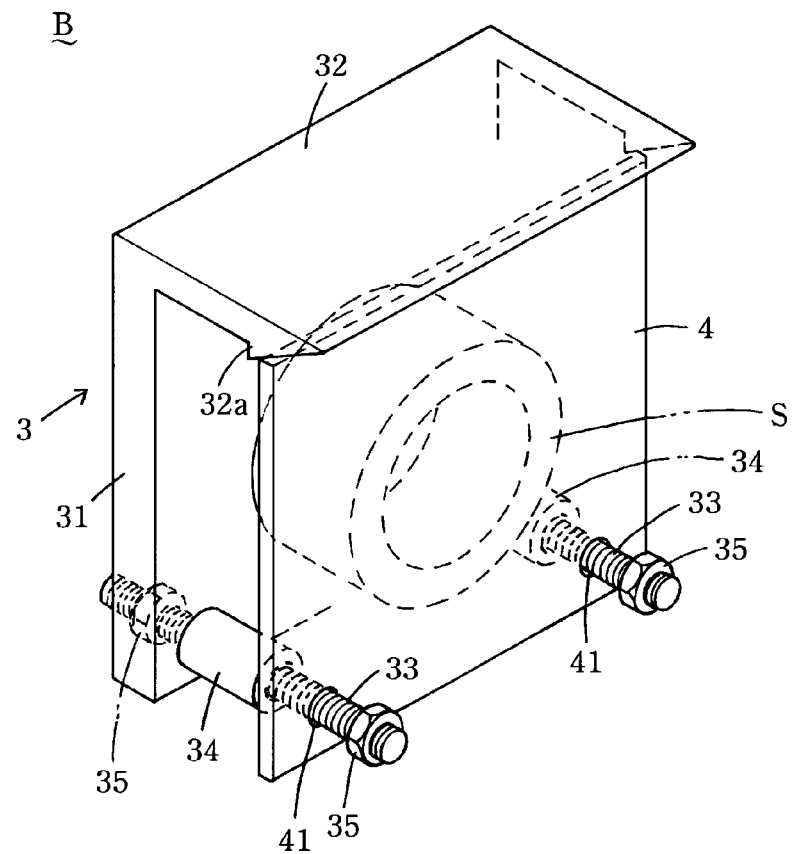
FIG. 7 is a perspective view showing a testing device for measuring assemblability.
Figure 8:
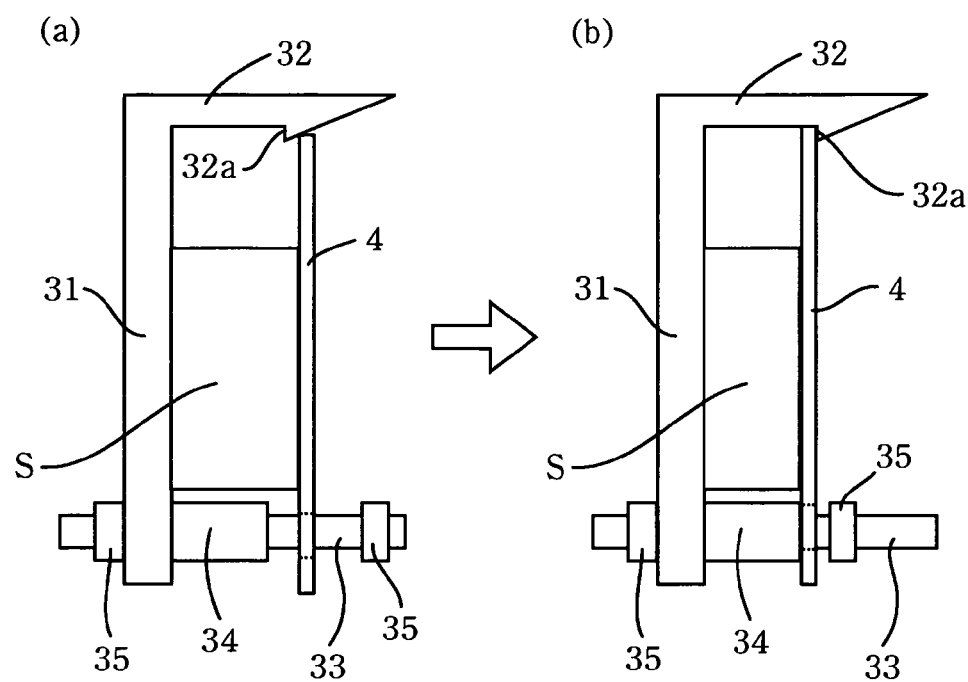
FIG. 8 is a side view of a test device showing the procedure of measuring assemblability.

Then, a testing device B shown in FIGS. 7 and 8 was prepared. The testing device B comprises a catching member 3 and a pressing plate 4 having a uniform thickness and a rectangular shape when seen from the front. The catching member 3 has a vertical portion 31 having a rectangular shape when seen from the front and a horizontal portion 32 extending from the upper end of the vertical portion 31 in the horizontal direction. Further, a locking portion 32a downwardly extends from the end of the horizontal portion 32 in its entire width.

Bolts 33 are integrally provided on the left and right lower end portions of the vertical portion 31 of the catching member 3. The bolts 33 are placed horizontally to the catching member 3 on the side where the horizontal portion 32 is present. On each of the bolts 33, a cylindrical spacer 34 and a nut 35 was provided. The spacer 34 has a length equal to the distance between the opposing surfaces of the vertical portion 31 and the pressing plate 4 in a state where the upper end of the pressing plate 4 are locked by the locking portion 32a in the horizontal portion 32 of the catching member 3. Further, the nut 35 is slidably screwed onto each bolt 33.

On the other hand, through holes 41 are formed through the pressing plate 4 on its left and right lower end portions. The bolts 33 of the catching member 3 can be threaded through the through holes 41.

The assemblability of the sealing material was measured by using the testing device B as follows. First, the catching member 3 was placed in a predetermined position so that the vertical portion 31 is upright. The test sample S was fixed to one surface of the catching member 3 by interposing a double-side adhesive tape (see FIG. 8(a)).

Then, after the bolts 33 of the catching member 3 were threaded through the through holes 41 of the pressing plate 4, the pressing plate 4 was pushed by a forefinger toward the vertical portion 31 of the catching member 3. The push was aimed to compress the test sample S in its thickness direction for locking the upper end of the pressing plate 4 to the locking portion 32a of the horizontal portion 32 in the catching member 3 (see FIG. 8(b)). The case was evaluated to be "O", where the upper end of the pressing plate 4 was locked to the locking portion 32a of the horizontal portion 32 in the catching member 3 by pushing only with a forefinger. The case was evaluated to be "X", where the upper end of the pressing plate 4 could not be locked to the locking portion 32a of the horizontal portion 32 in the catching member 3 by pushing only with a forefinger. Here, the sealing material was adjusted to have a compressed thickness that is 75% of the thickness before being compressed, in the state where the upper end of the pressing plate 4 is locked to the locking portion 32a of the horizontal portion 32 in the catching member 3.
(Short-Term Water Resistance)

A double-side adhesive tape was applied to the whole surface of the thermoplastic resin foam sheet of the sealing material. Then, a test sample S was punched out of the sealing material completely through the entire thickness in a ring shape having an external diameter of 60 mm and an internal diameter of 40 mm. With regard to the sealing material of Comparative Example 3, a double-side adhesive tape was applied to any one of the surfaces of the urethane foam sheet and a test sample was punched out of the sealing material in the same manner as above described.

The test sample was sandwiched between two acrylic resin plates which are in parallel with each other. The test sample was compressed in its thickness direction by these two acrylic resin plates so that the compressibility of the test sample was 25%, namely, the compressed thickness of the test sample was 25% of the thickness thereof before being compressed.

One of these two acrylic resin plates has a through hole, through which water is supplied and pressure is applied, at the position corresponding to the center part of the test sample. The water resistance test was carried out as follows. Tap water was supplied through this thorough hole to fill the space surrounded by the opposing surfaces of the two acrylic resin plates and the test sample, and then, the pressure of 5 kPa was applied thereto at 23° C. for one hour. The presence of leaking water was visually observed. The case where even just a drop of leaking water was observed was evaluated as "X". The case where no leaking water was observed was evaluated as "O". These evaluations were shown in the column of "Tap water" in Table 1.

Another water resistance test was carried out and the presence of leaking water was visually observed in the same manner as in the case of using tap water, except that a commercially available liquid detergent for washing cars was used instead of tap water. The same criteria were employed for evaluations and the results were shown in the column of "Surface active agent" in Table 1.

A test sample was sandwiched between two acrylic resin plates in the same manner as in the case of using tap water. Then, the sample was cooled at −20° C. for 12 hours and then heated at 80° C. for 12 hours. The above process of cooling and heating was regarded as 1 cycle and 3 cycles of the process were carried out. The presence of leaking water was visually observed by carrying out the water resistance test in the same manner as in the case of using tap water and evaluated based on the same criteria. The results were shown in the column of "Thermal cycling test" in Table 1.

(Long-term Water Resistance)

A double-side adhesive tape was applied to the whole surface of the thermoplastic resin foam sheet of the sealing material. Then, a test sample was punched out of the sealing material in a ring shape having an external diameter of 60 mm and an internal diameter of 40 mm. With regard to the sealing material of Comparative Example 3, a double-side adhesive tape was applied to any one of the surfaces of the urethane foam sheet and a test sample was punched out of the sealing material in the same manner as above described.

The test sample was sandwiched between two acrylic resin plates which are in parallel with each other. The test sample was compressed in its thickness direction by these two acrylic resin plates so that the compressibility of the test sample was 25%, namely, the compressed thickness of the test sample was 25% of the thickness thereof before being compressed.

One of these two acrylic resin plates has a through hole, through which water is supplied and pressure is applied, at the position corresponding to the center part of the test sample. The water resistance test was carried out as follows. Tap water was supplied through this thorough hole to fill the space surrounded by the opposing surfaces of the two acrylic resin plates and the test sample, and then, the pressure of 3 kPa was applied thereto at 23° C. for 24 hours. The presence of leaking water was visually observed. The case where even just a drop of leaking water was observed was evaluated as "O". The case where no leaking water was observed was evaluated as "X".

(Peel Strength)

A rubber resin sheet of the sealing material and a closed cell foam sheet comprising a rubber resin were respectively applied to acrylic plates having surface roughness of 0.15 Ra measured in accordance with JIS B0601. The peel strength thereof was respectively measured right after the application, after keeping at 23° C. for 12 hours of the sheet applied to the acrylic plate, and after keeping at 70° C. for 24 hours of the sheet applied to the acrylic plate, in accordance with JIS K6850.

TABLE 1

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Sealing material | Polyethylene foam sheet | Density (kg/m$^3$) | 33 | 28 | 25 | 33 | 33 | 33 | 20 | 33 |
| | | Thickness (mm) | 7.5 | 5 | 5 | 7.5 | 7.5 | 7.5 | 8 | 7.5 |
| | | Closed cell ratio (%) | 30 | 45 | 40 | 30 | 5 | 85 | 2 | 85 |
| | | Hole portion Formed on | Both surfaces | One surface | Both surfaces | Both surfaces | NA | NA | NA | NA |
| | | Diameter of opening edge (mm) | 0.3 | 0.3 | 0.3 | 0.3 | — | — | — | — |
| | | Pitch (mm) | 2 to 2.82 | 1.5 to 2.1 | 1.5 to 2.1 | 2 to 2.82 | — | — | — | — |
| | | Depth (mm) | 3 | 4 | 2 | 3 | — | — | — | — |
| | Rubber resin sheet | Type | NBR | NBR | NBR | IIR | NBR | NBR | — | V59 IIR |
| | | Density (kg/m$^3$) | 960 | 50 | 50 | 920 | 960 | 960 | — | 920 |
| | | Thickness (mm) | 0.5 | 3 | 3 | 0.5 | 0.5 | 0.5 | — | 0.5 |
| | Peel strength (kPa) | Right after application | 25 | 31 | 31 | 27 | 25 | 25 | — | 27 |
| | | After curing at 23° C. × 12 hours | 70 | 55 | 55 | 80 | 70 | 70 | — | 80 |
| | | After curing at 70° C. × 24 hours | 80 | 82 | 82 | 90 | 80 | 80 | — | 90 |
| | Whole | Thickness (mm) | 8 | 8 | 8 | 8 | 8 | 8 | 8 | 8 |
| | | 25% compression strength (kPa) | 33 | 22 | 22 | 33 | 6 | 45 | 15 | 45 |
| Performance | | Assemblability | O | O | O | O | O | X | O | X |
| | Short-term water resistance | Tap water | O | O | O | O | X | O | X | O |
| | | Surface active agent | O | O | O | O | X | O | X | O |
| | | Thermal cyclic test | O | O | O | O | X | O | X | O |
| | Long-term water resistance | | O | O | O | O | X | O | X | O |

INDUSTRIAL APPLICABILITY

The sealing material of the present invention has excellent water resistance right after the use thereof and even after a long time has elapsed. Accordingly, the sealing material of the present invention is suitably used in various fields such as architecture, civil engineering, electrics, electronics, and vehicles.

The invention claimed is:

1. A sealing material comprising:
   a rubber resin sheet; and
   a thermoplastic resin foam layer formed at least on one surface of the rubber resin sheet,
   wherein the sealing material has a 25% compressive strength in a thickness direction of 2 to 40 kPa as measured in accordance with JIS K6767,
   the thermoplastic resin foam layer has a closed cell ratio of 10 to 60% and at least three hole portions formed thereon, wherein the at least three hole portions comprise an opened edge and have a depth of 25 to 80% of a thickness of the thermoplastic resin foam layer, and the at least three hole portions are disposed so that a center of the opened edge of each hole portion is equally spaced from that of the center of the opened edge of an adjacent hole portion at a distance of 0.5 to 5 mm, and the rubber resin sheet does not have a hole portion disposed therein.

2. The sealing material according to claim 1, wherein the thermoplastic resin foam layer is integrally laminated to one surface of the rubber resin sheet.

3. The sealing material according to claim 1, wherein the rubber resin sheet is a rubber resin foam sheet.

4. The sealing material according to claim 3, wherein the rubber resin foam sheet is a closed cell foam sheet.

5. The sealing material according to claim 2, wherein the rubber resin sheet is a rubber resin foam sheet.

* * * * *